(12) United States Patent
Birk

(10) Patent No.: US 11,542,965 B2
(45) Date of Patent: Jan. 3, 2023

(54) METHOD FOR OPERATING A HYDRAULIC VALVE OF A HYDRAULIC DEVICE OF A MOTOR VEHICLE TRANSMISSION DEVICE AS WELL AS A MOTOR VEHICLE TRANSMISSION DEVICE

(71) Applicant: AUDI AG, Ingolstadt (DE)

(72) Inventor: Andreas Birk, Nuremberg (DE)

(73) Assignee: AUDI AG, Ingolstadt (DE)

( * ) Notice: Subject to any disclaimer, the term of this patent is extended or adjusted under 35 U.S.C. 154(b) by 448 days.

(21) Appl. No.: 16/817,788

(22) Filed: Mar. 13, 2020

(65) Prior Publication Data

US 2020/0318661 A1 Oct. 8, 2020

(30) Foreign Application Priority Data

Apr. 3, 2019 (DE) .......................... 102019204724.6

(51) Int. Cl.
*F15B 19/00* (2006.01)
*F15B 21/00* (2006.01)
(Continued)

(52) U.S. Cl.
CPC .......... *F15B 19/005* (2013.01); *F15B 21/008* (2013.01); *G05D 19/00* (2013.01); *G05D 19/02* (2013.01); *F15B 2211/8646* (2013.01)

(58) Field of Classification Search
CPC ........ F15B 2211/527; F15B 2211/8646; F15B 21/008; F15B 19/005; G05D 19/02; G05D 19/00
See application file for complete search history.

(56) References Cited

U.S. PATENT DOCUMENTS

| 2009/0206292 A1* | 8/2009 | Popp ................... F16H 61/0251 251/129.15 |
| 2009/0225489 A1 | 9/2009 | Lehner et al. |
| 2016/0245398 A1 | 8/2016 | Eglinger et al. |

FOREIGN PATENT DOCUMENTS

| CN | 101096972 A | 1/2008 |
| CN | 101532585 A | 9/2009 |

(Continued)

OTHER PUBLICATIONS

Office Action dated Apr. 2, 2020, in corresponding German Application No. 10 2019 204 724.6 including partial machine-generated English language translation; 6 pages.
(Continued)

*Primary Examiner* — Abiy Teka
*Assistant Examiner* — Daniel S Collins
(74) *Attorney, Agent, or Firm* — Maier & Maier, PLLC

(57) ABSTRACT

A method for operating a hydraulic valve of a hydraulic device of a motor vehicle transmission device, wherein an actuating current of the hydraulic valve is superposed with a modulation alternating current in order to adjust a shaking vibration of the hydraulic valve by a control device, wherein a deviation between an actual pressure resulting from the actuating current and a setpoint pressure determined as a function of the actuating current is determined for the hydraulic device by means of an electronic computing device, and an amplitude and/or a frequency of the modulation alternating current is increased as compared to a starting value equalizing a hysteresis of the actual pressure relative to the setpoint pressure, as a function of a tolerance range being exceeded by the determined deviation.

10 Claims, 2 Drawing Sheets

(51) Int. Cl.
*G05D 19/00* (2006.01)
*G05D 19/02* (2006.01)

(56) References Cited

FOREIGN PATENT DOCUMENTS

| | | |
|---|---|---|
| CN | 101882497 A | 11/2010 |
| CN | 102720714 A | 10/2012 |
| CN | 104126090 A | 10/2014 |
| CN | 105221503 A | 1/2016 |
| CN | 107850232 A | 3/2018 |
| CN | 107940030 A | 4/2018 |
| CN | 108757643 A | 11/2018 |
| CN | 109477593 A | 3/2019 |
| DE | 4423102 A1 | 1/1996 |
| DE | 19937053 A1 | 2/2000 |
| DE | 10 2006 012 657 A1 | 9/2007 |
| DE | 102008000304 A1 | 8/2009 |
| DE | 102011114063 A1 | 4/2012 |
| JP | H06-84636 A | 3/1994 |

OTHER PUBLICATIONS

Chinese Office Action dated Apr. 23, 2021, in connection with corresponding CN Application No. 202010255857.3 (11pp., including machine-generated English translation).

\* cited by examiner

METHOD FOR OPERATING A HYDRAULIC VALVE OF A HYDRAULIC DEVICE OF A MOTOR VEHICLE TRANSMISSION DEVICE AS WELL AS A MOTOR VEHICLE TRANSMISSION DEVICE

FIELD

The disclosure relates to a method for operating a hydraulic valve of a hydraulic device of a motor vehicle transmission.

BACKGROUND

DE 10 2011 114 063 A1 discloses a method for actuating an electrically actuatable hydraulic valve. In the method, an actuating current of the hydraulic valve is modulated in order to reduce an unwanted hysteresis during operation of the hydraulic valve. In this case, a superposition of the actuating current of the hydraulic valve is briefly increased when an unwanted hysteresis has been detected by comparing an expected current/pressure characteristic curve with a measured current/pressure characteristic curve.

Furthermore, DE 10 2008 000 304 A1 discloses a method for operating a valve device of a transmission device of a vehicle drivetrain, in which a hydraulic pressure value of a hydraulic system of the transmission device can be set via a valve unit as a function of a current signal, which is pending and pulse-width-modulated at an electromagnetic actuating unit. An amplitude and/or a pulse duration of the pulse-width-modulated current signal is modified periodically by means of a dither modulation superposed on the pulse width modulation while retaining the pressure value to be set. This causes a vibrational motion to be applied to an anchor, which is designed to be moveable longitudinally, as well as to an actively connected valve tappet of the valve unit of the valve device. The dither modulation is activated or deactivated upon the exceeding of a pressure value set via the valve device. By superposing the dither modulation over the pulse width modulation, a shaking vibration is created in the area of the anchor of the electromagnetic actuating unit and in the area of the valve device's valve tappet operatively connected thereto, said shaking vibration reducing friction and thus the hysteresis of the valve device.

DE 199 37 053 A1 discloses a method regarding this for adapting a control current for a pressure-control valve. A modulation current of predetermined amplitude and frequency is superposed on the control current supplied to the pressure-control valve. Moreover, there is a check to determine whether the coupling pressure of the modulation of the control current follows with a predetermined amplitude, said control pressure being detected by the pressure sensor. If this is not the case, a control current characteristic map stored in a control unit is modified.

SUMMARY

The object of the present disclosure is to obtain a method for operating a hydraulic valve of a hydraulic device of a motor vehicle transmission device as well as a motor vehicle transmission device which enable especially advantageous cleaning of the hydraulic valve during the operation thereof.

The disclosure relates to a method for operating a hydraulic valve of a hydraulic device of a motor vehicle transmission device, in which an actuating current of the hydraulic valve is superposed with a modulation alternating current in order to adjust a shaking vibration of the hydraulic valve by means of a control device. In particular, the adjustment of the shaking vibration serves to reduce a hysteresis in the hydraulic valve, whereby an especially secure and precise actuation of the hydraulic valve is enabled. The shaking vibration with respect this enables an especially low static friction of the hydraulic valve such that the hydraulic valve can be actuated especially quickly, uniformly, and precisely.

In order to enable an especially advantageous cleaning of the hydraulic valve during the operation thereof and to simultaneously ensure ease of operation of the hydraulic valve, it is provided according to the disclosure that a deviation between an actual pressure resulting from the actuating current and a setpoint pressure determined as a function of the actuating current is determined for the hydraulic device by means of an electronic computing device, and an amplitude and/or a frequency of the modulation alternating current is modified as compared to a starting value equalizing a hysteresis of the actual pressure relative to the setpoint pressure, as a function of an exceeding of a tolerance range by the determined deviation. This means that the actuating current is superposed with the modulation alternating current in order to strengthen a shaking vibration equalizing the hysteresis beyond its hysteresis-equalizing content, whereby the hydraulic valve can become dirty. The modulation alternating current superposed on the actuating current has the starting value for the amplitude and the frequency for equalizing the hysteresis, wherein the modulation alternating current is selected such that the hysteresis in the hydraulic valve is kept especially low. To ensure the lowest possible load of the hydraulic valve due to the increased shaking vibration, the modulation alternating current is then only increased when the deviation between the actual pressure and the setpoint pressure is outside of the specified tolerance range for the deviation. The actuating pressure is the pressure which adjusts in the hydraulic device when the specified actuating current is supplied to the hydraulic valve. The setpoint pressure describes the pressure which is expected upon actuation of the hydraulic valve with the actuating current as pressure resulting in the hydraulic device. If the actual current deviates from the setpoint current outside the tolerance range, faulty function of the hydraulic valve is then determined and the modulation alternating current is modified with respect to its amplitude and/or its frequency as compared to the starting value, particularly increased with respect to an input of energy into the hydraulic valve, in order to eliminate a potential cause of the faulty function, for example dirt. The modulation alternating current can be set to the starting value and several enhancement settings different from one another, particularly specifically three enhancement settings different from one another. If faulty function of the hydraulic valve is determined, the modulation alternating current is adjusted from the starting value to an initial, lowest of the enhancement settings. If the faulty function of the hydraulic valve is still determined during a check of the hydraulic valve, then the modulation alternating current can be adjusted from the first enhancement setting to a second enhancement setting, which is higher than the first enhancement setting. If the faulty function of the hydraulic valve is still determined upon a further check, then the modulation alternating current can be adjusted to the third, highest, and/or strongest enhancement setting as compared to the first enhancement setting and compared to the second enhancement setting.

Thus, with the method, the hydraulic valve is caused to vibrate more strongly in stages, beyond the shaking vibration equalizing the hysteresis, in order to clean dirt from the hydraulic valve.

In an advantageous refinement of the disclosure, it is provided that a maximum envelope curve arranged above the characteristic curve and a minimum envelope curve arranged below the characteristic curve are superimposed on a characteristic curve of the setpoint pressure, with each envelope curve defining a limit curve for the deviation and including the tolerance range for the determined deviation, within said tolerance range the modulation alternating current corresponds to the starting value. This means that the minimum and the maximum envelope curve define the tolerance range, as a function of which the modulation alternating current is set. If the deviation determined between the actual pressure and the setpoint pressure in the hydraulic valve is within the tolerance range, then the modulation alternating current is set to the starting value. If the deviation between the actual pressure and the setpoint pressure of the hydraulic device is outside of the tolerance range, then the modulation alternating current increases as compared to the starting value in that the amplitude and/or the frequency is adapted. In particular, the fault state of the hydraulic valve is defined in that the deviation between the actual pressure and the setpoint pressure of the hydraulic device is outside the tolerance range. Consequently, the method ensures that the modulation alternating current is then only increased as compared to the starting value when there is a fault state, whereby damage to the hydraulic valve due to high loads, particularly due to strong vibrations, can be avoided.

Furthermore, it has been shown to be advantageous when the amplitude and/or the frequency of the modulation alternating current is modified by a defined value as compared to the starting value of the modulation alternating current; in particular, an input of energy supplied to the hydraulic valve via the modulation alternating current is increased as compared to the starting value when a deviation is determined between the actual pressure and the setpoint pressure, which is outside the tolerance range, within a specified time interval. In other words, a timer is started at a defined point in time, said timer measuring and/or documenting expiration of the time interval. Both the starting point and a defined duration are specified for the time interval. For example, the deviation between the actual pressure and the setpoint pressure over the time interval or over a time span different from the time interval can be checked within the scope of a testing process. If it is determined that the deviation between the actual pressure and the setpoint pressure is outside the tolerance range within the specified time interval, the modulation alternating current is increased as compared to the starting value in that the amplitude and/or the frequency of the modulation alternating current is adapted. This means that a continual check of the deviation between the setpoint pressure and the actual pressure to facilitate an interval check, particularly repeated interval checks, is not necessary. Instead of this, the hydraulic valve is checked several times, particularly at regular intervals and/or as triggered by events, over the course of the time interval.

In a further embodiment of the disclosure, it has been shown to be advantageous when the amplitude and/or the frequency of the modulation alternating current is modified by a defined value as compared to the starting value of the modulation alternating current; in particular, an input of energy supplied to the hydraulic valve via the modulation alternating current is increased as compared to the starting value when an integral of deviation of the actual pressure exceeds a specified threshold value, beyond one of the limit curves, over time. This means that the integral of deviation between the actual pressure and the setpoint pressure is determined provided the deviation is outside the tolerance range. In this case, the integral of the determined deviation over time is determined as compared to the respectively closer limit curve, which means that the area is determined which includes a curve of the deviation over time with the respectively closer limit curve. If the determined integral of deviation exceeds the threshold values specified for the interval, then the modulation alternating current is increased in that the amplitude and/or the frequency is adapted. An increase in the modulation alternating current based on the deviation being outside the tolerance range for a brief period, for example due to a faulty measurement, can be at least advantageously substantially excluded in this case. The incidence of errors of the method can hereby be kept especially low.

The modulation alternating current is adjusted particularly to the starting value when the deviation is continually within the tolerance range within the defined time interval and/or an exceeding of the threshold value is suppressed due to the integral of deviation. The integral of deviation can be monitored, particularly within the scope of a testing process, during the specified time interval, wherein the increase in the modulation alternating current occurs within the specified time interval and the determined integral of deviation exceeds a specified threshold value beyond the limit curves.

In a further embodiment of the disclosure, it has been shown to be advantageous when the modulation alternating current is reset to the starting value when the determined deviation is within the tolerance range over the long-term during superposition of the actuating current with the increased modulation alternating current within a defined time span. The time span can be specified, for example, within a testing process, in which the hydraulic valve is operated in a test state, wherein the determined deviation is checked over the time span within the scope of the testing process. For example, after setting of the modulation alternating current to the increased modulation alternating current, the actuating current can be superposed with the increased modulation alternating current, at least for the specified time span. If it is determined that the determined deviation is within the tolerance range over the long-term during the time span, then the modulation alternating current is set to the starting value and thus is reset upon expiration of the time span. This can ensure that the actuating current of the hydraulic valve is only superposed with the increased modulation alternating current as long as is necessary to eliminate the fault state, and the modulation alternating current is reset to the starting value after elimination of the fault state.

In this context, it has proven to be especially advantageous when the modulation alternating current is further increased when the determined deviation exceeds the tolerance range upon superposition of the actuating current with the increased modulation alternating current within the defined time span and/or an integral of deviation of the actual pressure exceeds the tolerance range beyond the threshold value specified over time. For example, the modulation alternating current can be increased from the first enhancement setting to the second enhancement setting when a deviation is determined outside the tolerance range within the defined time span and thus during the testing process and/or the interval deviation with the limit curve respectively closest to the deviation exceeds the specified threshold value over time. If it is thus determined during the time span that the fault state of the hydraulic valve is still present or has returned, then the increased modulation alternating current is further increased in order to further increase the shaking vibration of the hydraulic valve as compared to a shaking vibration of the hydraulic valve with the increased modulation alternating current in order to remove any dirt possibly present from the hydraulic valve.

Especially thorough cleaning of the hydraulic valve can hereby be enabled during operation of the hydraulic valve.

In a further embodiment of the disclosure, it has been shown to be advantageous when the characteristic curve of the setpoint pressure is divided into different pressure ranges and the time interval and/or the threshold value is specified individually for each of the pressure ranges. The respective different pressure ranges may represent respective different transmission states, particularly respective different adjustable gears and/or torque ranges in the motor vehicle transmission device. Thus, the time interval and/or the threshold value can be coordinated for each of the pressure ranges and thus for each transmission state of the motor vehicle transmission device, whereby respective properties of the motor vehicle transmission device can be included in the different transmission states during operation of the hydraulic valve.

In a further advantageous embodiment of the disclosure, it is provided that the tolerance range is specified as a function of a pressure gradient and/or an active pressure and/or an oil temperature of the motor vehicle transmission device. A pressure gradient is a pressure change within the hydraulic device over a specified time period. The active pressure describes a difference between the setpoint pressure and a level of a kiss-point pressure of the motor vehicle transmission device. Because respective properties of oil in the hydraulic device can change as a function of the respective oil temperature, the specifying of the tolerance range may be especially advantageous as a function of the oil temperature. Setting of the tolerance range as a function of the pressure gradient and/or the active pressure and/or the oil temperature of the motor vehicle transmission device has the advantage that a sensitivity of determining the fault state can be adapted especially advantageously to a state of the motor vehicle transmission device.

In a further embodiment of the disclosure, it has been shown to be advantageous when a fault message characterizing the increase is stored in the electronic computing device in the event of an increase in the modulation alternating current. The fault state of the motor vehicle transmission device can hereby be especially advantageously documented. In this case, the fault message represents the determined fault state of the hydraulic valve.

Furthermore, the disclosure relates to a motor vehicle transmission device with a hydraulic device having a hydraulic valve. According to the disclosure, the hydraulic valve is configured to be operated in accordance with a method, as has previously been described in connection with the method according to the disclosure. Advantages and advantageous refinements of the method according to the disclosure should be considered advantages and advantageous refinements of the motor vehicle transmission device according to the disclosure and vice versa. For this reason, the advantages and advantageous refinements of the motor vehicle transmission device are not described again here.

In modern transmissions today, which are implemented to increase efficiency sometimes as low-leak designs, hydraulic valves with very tight radial gaps are used. This has the disadvantage that dirt which has collected or other deposits, sometimes also in combination with slightly tilted pistons under transverse forces, can make the valve operate sluggishly. In order to prevent these effects, for example to flush out the valve gaps and/or gaps in a magnetic part of the hydraulic valve designed, for example, as a solenoid valve, so-called valve excitation functions are used. This can take place, for example, in the form of one or more sequential current peaks, a variation of a superposition of the actuating current, or other measures.

These valve excitation functions are normally controlled functions which do not contain any check with respect to effectiveness. This means that these valve excitation functions are predictably designed as a function of corresponding boundary conditions and at least in a chronologically controlled manner. This means that execution of the valve excitation functions takes place independently of the determination of a fault state. This functionality of the valve excitation functions has the disadvantage that, in the event of a faulty function, for example the hydraulic valve is operating sluggishly due to dirt or wear, the measures of common valve excitation functions are not sufficient and, as a result of this, there can be noticeable impacts on driving behavior for a driver of a vehicle having the motor vehicle transmission device, particularly a motor vehicle.

By continually evaluating setpoint pressure compared to actual pressure, the method according to the disclosure means that a faulty function of the hydraulic valve can be detected early on and corresponding countermeasures can be implemented early. To this end, the maximum envelope curve and the minimum envelope curve are superimposed on the setpoint pressure or on the characteristic curve of the setpoint pressure resulting from the actuating current. Applying the characteristic curve of the setpoint pressure ideally resulting from the actuating current means that a time delay can be eliminated between a setpoint actuating current and an actual actuating current on the hydraulic valve. If the determined deviation deviates from the characteristic curve of the setpoint pressure beyond the envelope curve, then a first stage of a mobilizer function is activated, wherein, in the first stage of the mobilizer function, the actuating current is superposed with the modulation alternating current having the first enhancement setting. The mobilizer function is kept constant in one stage for the specified time interval such that, at least for the specified time interval, the actuating current is superposed with the modulation alternating current having the first enhancement setting. After the specified time interval has expired, the modulation alternating current can be reset to the starting value in order to check the hydraulic valve with respect to adherence to the tolerance range by means of the deviation between the setpoint pressure and the actual pressure. In particular, the deviation for the specified time interval is verified in a testing process. If the hydraulic valve passes the testing process with the result of "OK," then the mobilizer function is deactivated, and the hydraulic valve is operated at the actuating current which is superposed with the modulation alternating current having the starting value. If the testing process shows that the hydraulic valve is not OK, then the actuating current can be superposed with the modulation alternating current having the second enhancement setting, at least for defined time span. After the defined time span has expired, the modulation alternating current can be reset to the starting value, and the deviation for the specified time interval can be checked in order to implement the testing process. Depending on the result of the testing process, the modulation alternating current can be set to the starting value or to one of the enhancement settings after completion of the testing process, wherein the respectively sequentially set enhancement settings of the modulation alternating current have an increase, which is sequentially relative to one another, said increase relating to the input of energy into the hydraulic valve.

The described method means that a valve behavior of the hydraulic valve classified as "Not OK" in the testing process can be eliminated, said valve behavior possibly being noticeable to the driver of the motor vehicle having the motor vehicle transmission device in the form of impacts on comfort. Moreover, the hydraulic valve can be cleaned of dirt through a flushing effect resulting from the higher input of energy occurring with the enhancement settings of the modulation alternating current as compared to the starting value. In the event that the hydraulic valve cannot be cleaned by means of the increased input of energy of the modulation alternating current having the respective enhancement settings, the hydraulic valve can be sustainably operated with the higher input of energy of the modulation alternating current having one of the enhancement settings as compared to the starting value, provided the hydraulic valve is configured for sustainable operation with the increased input of energy.

The disclosure also comprises the combinations of the features of the described embodiments.

BRIEF DESCRIPTION OF THE DRAWINGS

Exemplary embodiments of the disclosure are described in the following. The following is shown.

DETAILED DESCRIPTION

Figure 1:
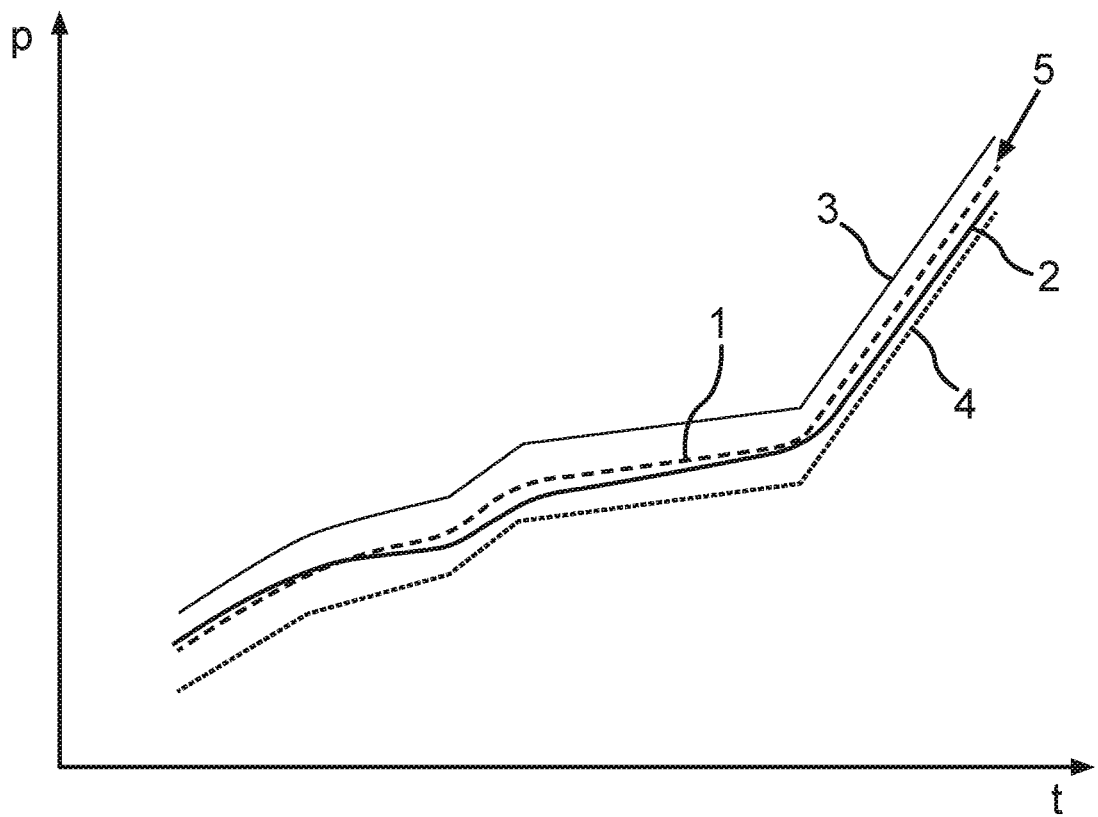
FIG. 1 a graphic of a curve of a setpoint pressure in the hydraulic device over time determined by an actuating current of a hydraulic valve of a hydraulic device of a motor vehicle transmission device, wherein a tolerance range for a deviation of an actual pressure in the hydraulic device is limited upward by a maximum envelope curve and limited downward by a minimum envelope curve.

The exemplary embodiments explained in the following refer to preferred embodiments of the disclosure. With the exemplary embodiments, the described components of the embodiments represent individual features to be considered independently of one another, which also further embody the disclosure independently of one another. Thus, the disclosure should also comprise combinations of the features of the embodiments other than those shown. Furthermore, the described embodiments can also be supplemented through further described features of the disclosure.

The same reference numerals refer to equivalent features and functions in the figures.

A method for operating a hydraulic valve of a hydraulic device of a motor vehicle transmission device shall be described in the following. The motor vehicle transmission device is part of a vehicle, particularly of a motor vehicle, particularly part of a passenger car or commercial vehicle or part of a passenger bus or motorcycle.

In order to adjust a shaking vibration of the hydraulic valve which particularly is used to equalize a hysteresis of the hydraulic valve, an actuating current of the hydraulic valve is superposed with a modulation alternating current. A setpoint pressure 1 to be expected as a result of the actuating current in the hydraulic device can be determined from the actuating current supplied to the hydraulic valve, the characteristic curve of said setpoint pressure being shown in FIG. 1 in a time/pressure diagram. The time t in this case is plotted on the x-axis, while the pressure p is plotted on the y-axis. Furthermore, the diagram in FIG. 1 shows an actual pressure 2 resulting in the hydraulic device as a result of the actuating of the hydraulic valve. A tolerance range 5, which is limited upward by a maximum envelope curve 3 and which is limited downward by a minimum envelope curve 4, is superimposed on the characteristic curve of the setpoint pressure 1. If the determined actual pressure 2 of the hydraulic device is within the tolerance range 5 superimposed on the characteristic curve of the setpoint pressure 1, this represents a fault-free state of the hydraulic valve. If the actual pressure 2 is outside the tolerance range 5, then this represents a fault state 11 of the hydraulic valve. Thus, the maximum envelope curve 3 as well as the minimum envelope curve 4 represent respective limit curves for a maximum deviation between the actual pressure 2 and the setpoint pressure 1, wherein the fault state 11 is determined in the hydraulic valve provided the actual pressure 2 deviates from the setpoint pressure 1 beyond the respective envelope curves. The fault state 11 is particularly determined provided the actual pressure 2 deviates from the characteristic curve of the setpoint pressure 1 outside the tolerance range 5 within a specified time interval. In particular, the fault state 11 in this case can only be determined when a curve describing the progression of the actual pressure 2 over the time interval encloses an area closer to the curve, said area exceeding a specified threshold value, with the respective envelope curve 3, 4. This means that the fault state 11 is determined when the integral of the curve describing the progression of the actual pressure 2 over the time interval exceeds the specified threshold value over the time interval with the one of the two envelope curves 3, 4 closer to the curve.

Respective intervals between the respective envelope curves 3, 4 defining the tolerance range 5 and the characteristic curve of the setpoint pressure 1 can be selected absolutely or relatively with respect to a particular pressure value of the setpoint pressure 1. Alternatively or additionally, the tolerance range 5 can be selected as a function of a pressure gradient and thus the increase in the characteristic curve of the setpoint pressure 1 and/or an active pressure and/or an oil temperature of the oil in the hydraulic device.

Alternatively or additionally, the characteristic curve of the setpoint pressure 1 can be divided into different pressure ranges, wherein the time interval and/or the threshold value can be individually assigned to each of the pressure ranges such that the different pressure ranges may have different time intervals and/or different threshold values.

The deviation between the actual pressure 2 and the setpoint pressure 1 can be determined by means of an electronic computing device 14. Thus, the fault state 11 of the hydraulic valve can be determined by means of the electronic computing device 14. If the fault state 11 is determined in the hydraulic valve, the modulation alternating current being superposed on the actuating current can be increased, by means of the control device, beyond the starting value equalizing the hysteresis, in order to cause an especially strong shaking vibration in the hydraulic valve.

The especially strong shaking vibration means that damage to the hydraulic valve is equalized and/or dirt is re-moved from a surface of the hydraulic valve.

Figure 2:
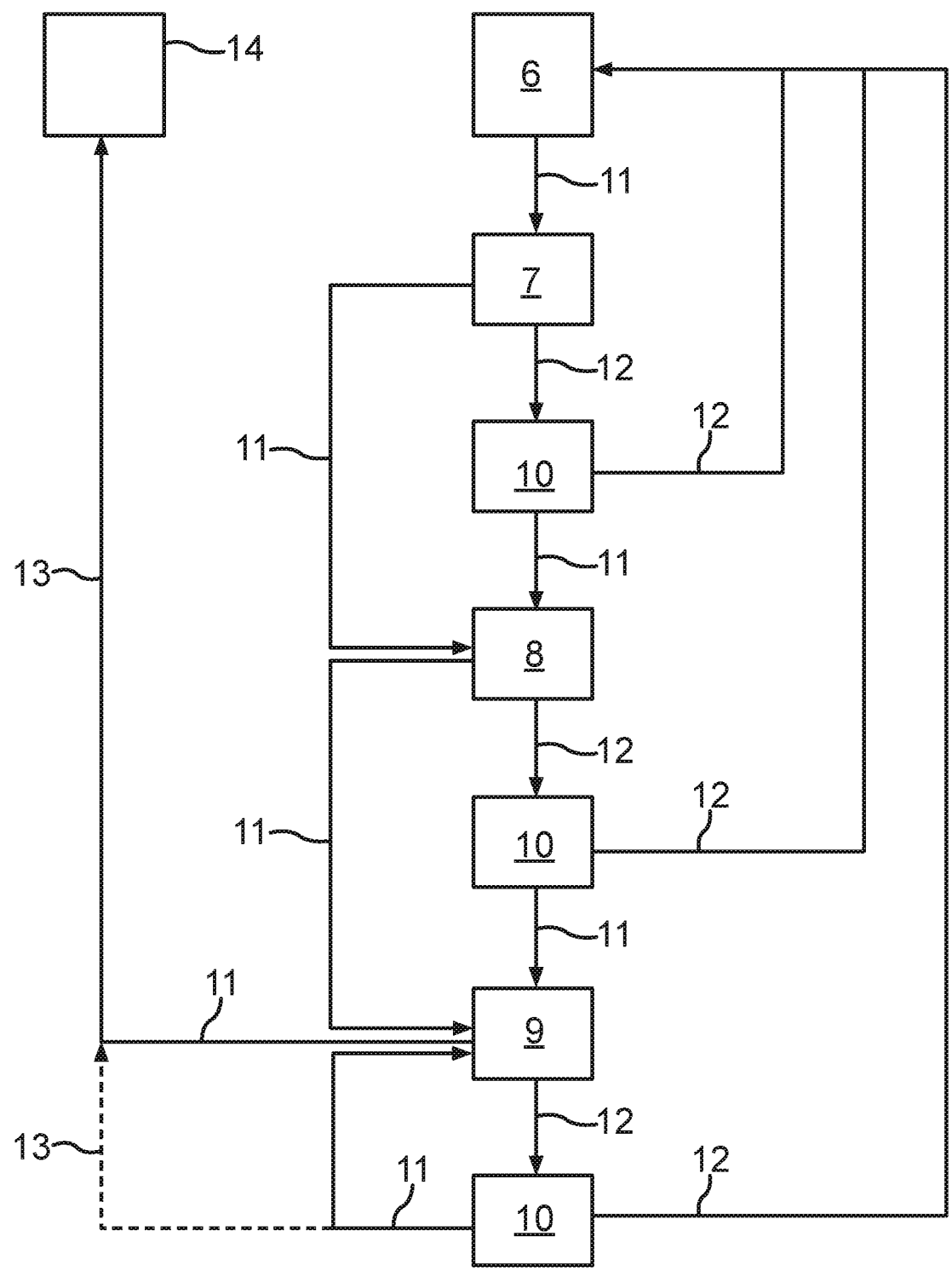
FIG. 2 a procedural diagram for a method characterized as a mobilizer method for operating the hydraulic valve of the hydraulic device, in which, as compared to a starting value of a modulation alternating current, increased enhancement settings of the modulation alternating current are activated in stages, and the hydraulic valve is checked with respect to the deviation between the actual pressure and the setpoint pressure during the respective enhancement settings of the modulation alternating current as well as after any resetting of the modulation alternating current to the starting value.

FIG. 2 shows the procedural diagram for the method characterized as the mobilizer method for operating the hydraulic valve. The hydraulic valve can be operated in a starting state 6, in which the actuating current is superposed with the modulation alternating current having the starting value. Moreover, the hydraulic valve can be operated in respective stages of a mobilizer function, wherein, in the respective stage, the actuating current is superposed with the modulation alternating current of an enhancement setting assigned to each of the stages. The mobilizer function describes operation of the hydraulic valve in a state in which the actuating current of the hydraulic valve is operated with the modulation alternating current in a respective enhancement setting, wherein the modulation alternating current of the respective enhancement settings is increased as compared to the starting value of the modulation alternating current in the starting state 6. The mobilizer function has three enhancement settings here, in which the respective modulation alternating current is increased in stages starting from the first to the third enhancement setting. This means that the modulation alternating current has a higher input of energy to the hydraulic valve in a second stage 8 with the second enhancement setting than in a first stage 7. The modulation alternating current has a greater input of energy in a third stage 9 with the third enhancement setting than in the second stage 8 and in the first stage 7. In order to increase the respective input of energy when switching the modulation alternating current from the starting state 6 to the first stage 7 or from the first stage 7 to the second stage 8 or from the second stage 8 to the third stage 9, the amplitude and/or the frequency of the modulation alternating current can be increased or, for an especially high input of energy respectively as compared to the starting value or to a previous value of the modulation alternating current in a stage of the mobilizer function to be exited, the amplitude of the modulation alternating current is increased and simultaneously the frequency of the modulation alternating current is decreased. In addition to the respective stages, the mobilizer function of the hydraulic valve additionally comprises a test state 10, in which the modulation alternating current is set to the starting value and the actual pressure 2 as compared to the setpoint pressure 1 is checked with respect to the occurring deviation over a specified time interval, particularly with respect to detecting a fault state 11 of the hydraulic valve.

An exemplary sequence for the mobilizer function is explained in the following with the procedural diagram shown in FIG. 2. If the fault state 11 is determined during operation of the hydraulic valve in the starting state 6 thereof, then the first stage 7 is activated such that the modulation alternating current is adjusted from the starting value to the first enhancement setting. If the fault state 11 is determined during the specified time span during operation of the hydraulic valve in the first stage 7, then the mobilizer function is increased from the first stage 7 to the second stage 8 and the hydraulic valve is operated with the actuating current superposed with the modulation alternating current of the second enhancement setting. If the fault state 11 is not determined at least for the specified time span during which the hydraulic valve is operated in the first stage 7 of the mobilizer function, which means that a fault-free state 12 of the hydraulic valve is determined, then the mobilizer function is transitioned from the first stage 7 into the test state 10. In the test state 10, the modulation alternating current is reset from the respective enhancement settings back to the starting value, and the actual pressure 2 is compared to the setpoint pressure 1 for a specified time interval. The time interval may be different than the time span or correspond to the time span. The time span and the time interval can be selected as a function of respectively different parameters. If the fault-free state 12 is determined during the test state 10, then the mobilizer function is ended and reset to the starting state 6. If the fault state 11 of the hydraulic valve is determined during the test state 10, then there is an adjustment to the second stage 8 of the mobilizer function. If the fault state 11 is determined in the second stage 8 over the time span during operation of the mobilizer function of the hydraulic valve, then the mobilizer function is increased from the second stage 8 to the third stage 9. If the fault-free state 12 of the hydraulic valve is determined in the second stage 8 of the mobilizer function over the time span, then the test state 10 is set in the mobilizer function. In the test state 10 which follows the second stage 8, the deviation between the actual pressure 2 and the setpoint pressure 1 over the time interval is checked, similar to the test state 10 which follows the first stage 7 of the mobilizer function. If the fault-free state 12 is determined in the test state 10 following the second stage 8, then the mobilizer function is reset to the starting state 6. If the fault state 11 is determined in the test state 10 following the second stage 8, then the mobilizer function is reset to the third stage 9. If the fault state 11 is determined in the third stage 9 over the time span during operation of the mobilizer function, then a fault-state signal 13 characterizing the fault state 11 is provided for the electronic computing device 14.

The electronic computing device 14 may be located on the vehicle side of the motor vehicle having the hydraulic valve or it may be outside the motor vehicle. The fault states 11 of the hydraulic valve, said fault states being characterized by the fault-state signal 13, are stored in the electronic computing device 14.

If the fault-free state 12 of the hydraulic valve is determined over the time span during the third stage 9, then the mobilizer function is switched from the third stage 9 to the test state 10, and the hydraulic valve is checked over the time interval with respect to the occurrence of the fault state 11 and/or of the fault-free state 12. If the fault-free state 12 occurs in the test state 10 following the third stage 9 during the time interval, then the mobilizer function is reset to the starting state 6. If the fault state 11 of the hydraulic valve is determined in the test state 10 during the time interval, then the mobilizer function is reset to the third stage 9.

The mobilizer function enters the first stage 7 starting from the starting state 6 by means of a deviation between the actual pressure 2 and the setpoint pressure 1 outside the tolerance range 5. The switching of the mobilizer function from the starting state 6 into the first stage 7 can be initialized when the maximum envelope curve 3 is exceeded and/or the minimum envelope curve 4 is initialized by the actual pressure 2 and/or a time curve of the actual pressure 2 relative to the respectively closest envelope curve 3, 4 is integrated and the threshold value is reached. In the first stage 7, an input of energy to the hydraulic valve is increased as compared to the starting state 6 in that a dither, which describes a superposing of the actuating current of the hydraulic valve with the modulation alternating current, is increased relative to the starting value of the modulation alternating current. The input of energy can be increased as compared to the starting value by reducing the frequency and/or increasing the amplitude of the modulation alternating current.

The first stage 7 remains active at least for the time span. If the fault state 11 is not detected for this time span and thus the fault-free state 12 is determined, then there is a switch into the test state 10. In this case, the superimposing of the actuating current with the modulation alternating current is reset from the first enhancement setting back to the starting value. If the fault-free state 12 is determined during the time interval of the test state 10 and thus no further pressure deviation is determined between the actual pressure 2 and the setpoint pressure 1 outside the tolerance range 5, then the mobilizer function is reset back to the starting state 6. In contrast, if the pressure deviation between the actual pressure 2 and the setpoint pressure 1 is detected to be outside the tolerance range 5 during the first stage 7, then the mobilizer function is switched into the second stage 8, in which the hydraulic valve is superposed with a stronger dither as compared to the first stage 7. If the fault state 11 is detected during the test state 10, which follows the first stage 7, then the mobilizer function can either be switched back into the first stage 7 in order to operate the hydraulic valve with the superposition of the actuating current applied to the first stage 7 or switched into the second stage 8 as is shown in the procedural diagram in FIG. 2. During the switch from the first stage 7 into the second stage 8, a marker can be set in the electronic computing device 14 which characterizes that the fault-free state 12 has been determined during operation of the hydraulic valve with the mobilizer function in the first stage 7 over the time span.

The goal of the mobilizer function is to restore an original ease of operation of the valve, starting from sluggish operation of the hydraulic valve caused by dirt, by means of an input of energy into the hydraulic valve, it being possible to increase said input of energy in stages. For this reason, the individual stages are passed through, presently the first stage 7, followed by the second stage 8, followed by the third stage 9, during the mobilizer function, before the hydraulic valve is sustainably operated with a dither, particularly the enhancement setting of the modulation alternating current, which is stronger as compared to the starting value of the modulation alternating current. It is possible that only individual stages of the mobilizer function are suitable for sustainable operation of the hydraulic valve. During the active second stage 8 in the mobilizer function, the input of energy and/or the dither is further enhanced relative to the first stage 7. The mobilizer function is switched into the test state 10 after ending of the time span of operation of the hydraulic valve with the second stage 8 of the mobilizer function. The general sequence in the second stage 8 and in the third stage 9 is similar to the sequence in the first stage 7. The third stage 9, as the strongest stage, can be activated several times successively as needed, particularly with continually detected fault states 11 and/or pressure deviations between the actual pressure 2 and the setpoint pressure 1 outside the tolerance range 5. In the event that the hydraulic valve cannot be operated without a detected fault state 11 during respective time spans even with an active third stage 9 and/or activated strongest stage of the mobilizer function and/or cannot be operated without a pressure deviation between the actual pressure 2 and the setpoint pressure 1 outside the tolerance range 5, a corresponding fault memory entry is stored in the electronic computing device 14, which in this case is a control unit. Alternatively or additionally, a fault message can be generated by means of an output device in a vehicle interior of the motor vehicle having the hydraulic valve. The fault message signals to the driver of the motor vehicle or a repair shop that there is a faulty function of the particular component, which is the hydraulic valve in this case.

If the fault-free state 12 is determined in the test state 10 following the third stage 9, then the mobilizer function is reset to the starting state 6. Contrary to the procedure shown in FIG. 2, the mobilizer function can be varied such that, upon a determination that the hydraulic valve can be operated in the second stage 8 for the time span without a deviation between the actual pressure 2 and the setpoint pressure 1 outside the tolerance range 5 and thus the fault-free state 12 is determined, but that the fault state 11 has been repeatedly detected in the starting state 6 of the mobilizer function, then the hydraulic valve can be sustainably operated in the first stage 7 or in the second stage 8.

This requires that operation of the hydraulic valve with the mobilizer function of the first stage 7 or of the second stage 8 has no negative impact on the durability of the hydraulic valve. Any impacts sustainable operation of the mobilizer function in the first stage 7 or in the second stage 8 has on consumption and/or range of the motor vehicle can be verified.

The respective stages, 7, 8, 9, as well as the indicated test states 10 are controlled chronologically with respect to their duration. The respective duration specified for stage 7, 8, 9 or the test state 10 can be extended provided the hydraulic valve has not yet been operated in certain pressure ranges in the respective stage 7, 8, 9 or in the test state 10 while the motor vehicle is being driven. If the motor vehicle or the hydraulic valve of the motor vehicle is operated in the respective different pressure ranges, it is possible that the fault state 11 for the hydraulic valve can only be determined in limited pressure ranges. The procedural diagram of the mobilizer function shown in FIG. 2 should be run through separately for each specified pressure range to prevent the mobilizer function from being reset back to the starting state 6 when the pressure range of the hydraulic valve has been modified from a pressure range having the fault state 11 into a pressure range not having the fault state 11, despite the hydraulic valve being flushed clean.

On the one hand, the described mobilizer function is used to clean a sluggishly operating hydraulic valve by means of an input of energy and associated flushing effects or to operate the hydraulic valve sustainably with an input of energy that is higher as compared to the starting value of the modulation alternating current. The mobilizer function should evaluate an actual state of the hydraulic valve and implement corresponding measures based thereupon, particularly an adjustment of a shaking vibration of the hydraulic valve. A valve behavior of the hydraulic valve is intended to be observed and evaluated over the respective time interval in test states 10 which are respectively initialized after one of stages 7, 8, 9 of the mobilizer function. If a subsequent valve behavior of the hydraulic valve fulfills requirements in the form of the tolerance range 5 to be maintained, then the mobilizer function is reset back to the starting state 6. If the requirements in the form of the tolerance range 5 to be maintained by the actual pressure 2 are not fulfilled, then the operation of the mobilizer function is triggered in the respective stages 7, 8, 9. Operation of the hydraulic valve with the mobilizer function enables an especially high degree of availability of the hydraulic valve, particularly of a motor vehicle having the hydraulic valve, for a customer, for example, in that time spent in a repair shop can be avoided. On the other hand, the mobilizer function prevents impact to driving behavior of the motor vehicle that is noticeable for the customer, particularly the driver.

Today, so-called valve actuators are used, primarily in modern transmission hydraulic systems, in order to flush out very tight gaps in hydraulic valves, said gaps being used in low-leak designs for reasons of efficiency. In this case, a shaking of the hydraulic valve is implemented particularly with one or more sequential cyclic current impulses or with a superposition of actuating current. This superposition is normally used to keep the hydraulic valve in a state of sliding friction between the pistons and the sleeve and thus to minimize stick-slip effects. The adjusted superposition in this case represents a compromise between leakage and the hysteresis of the hydraulic valve. A strong superposition of the actuating current with a high input of energy has a positive effect on the hysteresis and the elimination of the stick-slip effect, but has a negative impact on leakage of the hydraulic valve due to a strong axial valve movement. A correspondingly weak superposition of the actuating current has a positive effect on leakage and a negative effect on the hysteresis and the elimination of the stick-slip effect. Thus, the superposition should be set to be as weak as possible while specifically fulfilling requirements for the hysteresis and dynamic values. This minimal superposition carries the risk that particles or other dirt which has collected in the gaps of the hydraulic valve cannot be flushed out. Moreover, with the prior art, effects having a negative effect on the overall friction of the hydraulic valve and thus a strongly damping effect on the hydraulic valve cannot be overcome.

In order to initialize the mobilizer function, certain limits must be defined based on measurable values, by means of which a subsequent pressure behavior of the hydraulic valve can be evaluated. The minimum envelope curve 4 and the maximum envelope curve 3 are defined as the limits. The setpoint pressure 1 is calculated based on the actual actuating current present at the hydraulic valve, particularly via a learned valve characteristic curve. This is advantageous in that, compared to using a setpoint pressure determined as a function of a setpoint actuating current, a time delay between the setpoint actuating current and the actual actuating current does not have to be included in the determination of the tolerance range 5. The maximum deviation and thus the tolerance range 5 for the actual pressure 2 relative to the setpoint pressure 1 is defined based on the setpoint pressure 1 calculated from the actual actuating current and optionally further dependencies such as, for example, a pressure gradient, an amount of an active pressure which is a difference between the setpoint pressure 1 minus an amount of a kiss-point pressure of a clutch of the motor vehicle, and an oil temperature of oil in the hydraulic device. The maximum deviation between the actual pressure 2 and the setpoint pressure 1 is subtracted from and added to the characteristic curve of the setpoint pressure 1, whereby the minimum envelope curve 4 and the maximum envelope curve 3 limiting the tolerance range 5 are determined. The tolerance range 5 is calculated during an entire driving cycle and the determined actual pressure 2 is evaluated with respect to the defined tolerance range 5. The evaluating can be suspended if the kiss-point pressure of the clutch is not maintained by the setpoint pressure 1. Other effects can negatively impact a subsequent behavior of the hydraulic valve in this range, for example due to an unfilled clutch.

If the actual pressure 2 deviates from the tolerance range 5, either the integral can be completed or merely a timer started. If the integral reaches the threshold value or if the actual pressure 2 exceeds the tolerance range 5 within the time interval, then the mobilizer function is initialized to switch from the starting state 6 into one of stages 7, 8, 9.

Advantageous with the described method is that hydraulic valves, primarily in so-called low-leak designs, which have sluggish operation or are jammed can be flushed free and the faulty function of the respective hydraulic valve can be repaired. Disruptive driving behavior impacts to the motor vehicle can then be eliminated or at least reduced for the driver. Moreover, the method means that time spent in the repair shop and high repair costs can be avoided.

As a whole, the examples show how a software function can be provided by the disclosure in order to situationally increase the input of energy with sluggishly operating hydraulic valves and corresponding pressure deviation by means of varying a valve superposition within a defined activation and test sequence.

The invention claimed is:

1. A method for operating a hydraulic valve of a hydraulic device of a motor vehicle transmission device, comprising:
    superposing a modulation alternating current with an actuating current of the hydraulic valve to adjust a shaking vibration of the hydraulic valve by an electronic computing device,
    determining a deviation between an actual pressure resulting from the actuating current and a setpoint pressure as a function of the actuating current for the hydraulic device by the electronic computing device, and modifying an amplitude and/or a frequency of the modulation alternating current as compared to a starting value equalizing a hysteresis of the actual pressure relative to the setpoint pressure, as a function of a tolerance range being exceeded by the determined deviation,
    wherein a maximum envelope curve arranged above a characteristic curve and a minimum envelope curve arranged below the characteristic curve are superimposed on a characteristic curve of the setpoint pressure, each envelope curve defining a limit curve for the deviation and including the tolerance range for the determined deviation, within which the modulation alternating current corresponds to the starting value,
    wherein the amplitude and/or the frequency of the modulation alternating current is modified by a defined value as compared to the starting value of the modulation alternating current when an integral of deviation of the actual pressure exceeds a specified threshold value beyond one of the limit curves over time.

2. The method according to claim 1, wherein the amplitude and/or the frequency of the modulation alternating current is modified by a defined value as compared to the starting value of the modulation alternating current when a deviation is determined between the actual pressure and the setpoint pressure which is outside the tolerance range, within a specified time interval.

3. The method according to claim 1, wherein the modulation alternating current is reset to the starting value when the determined deviation is within the tolerance range upon superposition of the actuating current with the modified modulation alternating current, within a defined time span.

4. The method according to claim 3, wherein the modulation alternating current is further increased when the determined deviation exceeds the tolerance range and/or an integral of deviation of the actual pressure exceeds a specified threshold value outside the tolerance range over time, upon the superposition of the actuating current with the modified modulation alternating current, within the defined time span.

5. The method according to claim 1, wherein the characteristic curve of the setpoint pressure is divided into different pressure ranges and a time interval and/or the threshold value is specified individually for each of the pressure ranges.

6. The method according to claim 1, wherein the tolerance range is specified as a function of a pressure gradient and/or an active pressure and/or an oil temperature.

7. The method according to claim 1, wherein a fault message characterizing an increase in the modulation alternating current is stored in the electronic computing device.

8. The method according to claim 2, wherein the modulation alternating current is reset to the starting value when the determined deviation is within the tolerance range over the long-term upon superposition of the actuating current with the modified modulation alternating current, within a defined time span.

9. The method according to claim 2, wherein the characteristic curve of the setpoint pressure is divided into different pressure ranges and the time interval and/or the threshold value is specified individually for each of the pressure ranges.

10. The method according to claim 3, wherein the characteristic curve of the setpoint pressure is divided into different pressure ranges and the time interval and/or the threshold value is specified individually for each of the pressure ranges.

* * * * *